US010249935B2

(12) United States Patent
Ortel et al.

(10) Patent No.: US 10,249,935 B2
(45) Date of Patent: Apr. 2, 2019

(54) HANDRAIL WI-FI ENCLOSURE

(71) Applicant: TESSCO Communications Incorporated, Hunt Valley, MD (US)

(72) Inventors: Timothy Ortel, Timonium, MD (US); Christopher Jufer, San Antonio, TX (US); Dennis Burrell, Austin, TX (US)

(73) Assignee: TESSCO Communications Incorporated, Hunt Valley, MD (US)

(*) Notice: Subject to any disclaimer, the term of this patent is extended or adjusted under 35 U.S.C. 154(b) by 0 days.

(21) Appl. No.: 15/663,790

(22) Filed: Jul. 30, 2017

(65) Prior Publication Data
US 2019/0036200 A1    Jan. 31, 2019

(51) Int. Cl.
| H01Q 1/22 | (2006.01) |
| F16M 13/02 | (2006.01) |
| H04W 84/12 | (2009.01) |

(52) U.S. Cl.
CPC .......... *H01Q 1/2291* (2013.01); *F16M 13/02* (2013.01); *H04W 84/12* (2013.01)

(58) Field of Classification Search
CPC ...... H01Q 1/2291; F16M 13/02; H04W 84/12
USPC ...................................... 174/153 A
See application file for complete search history.

(56) References Cited

U.S. PATENT DOCUMENTS

| 4,138,953 A | 2/1979 | Tashman |
| 4,318,352 A | 3/1982 | Friedman |
| 5,545,854 A * | 8/1996 | Ishida ................. H02G 3/081 16/2.2 |
| 7,068,238 B2 | 6/2006 | Yoneya et al. |
| 7,187,333 B2 | 3/2007 | Yoneya et al. |
| 7,339,538 B2 | 3/2008 | Yoneya et al. |
| 7,567,214 B2 | 7/2009 | Takesawa et al. |
| 7,586,459 B2 | 9/2009 | Noro et al. |
| 8,179,326 B2 | 5/2012 | Chang |
| 8,264,420 B2 | 9/2012 | Sato et al. |
| 8,305,289 B2 | 11/2012 | Lo |
| 8,462,075 B2 | 6/2013 | Lettkeman |
| 2005/0059428 A1 | 3/2005 | Tung |
| 2008/0169996 A1 | 7/2008 | Yang |
| 2009/0137155 A1 | 5/2009 | Yeh |
| 2011/0303712 A1 | 12/2011 | Calamia |
| 2014/0049057 A1 | 2/2014 | Brandt |
| 2015/0181645 A1 | 6/2015 | Anderson |

* cited by examiner

*Primary Examiner* — Dhiru R Patel
(74) *Attorney, Agent, or Firm* — Shlesinger, Arkwright & Garvey LLP

(57) ABSTRACT

An enclosure for an access point for attachment to a handrail includes a first half-shell including a first peripheral flange portion and a second half-shell including a second peripheral flange portion, the first half-shell and the second half-shell being attached together along the first peripheral flange portion and the second peripheral flange portion to form the enclosure; a mounting plate disposed within the enclosure, the mounting plate including a peripheral edge portion coextensive with the first and second peripheral flange portions, the peripheral edge portion including first and second sides opposed to the respective first and second peripheral flange portions; and a seal disposed along the first and second sides of the peripheral edge portion, the seal on the first side being sandwiched between the first peripheral flange portion and the first side, the seal on the second side being sandwiched between the second peripheral flange portion and the second side.

30 Claims, 6 Drawing Sheets

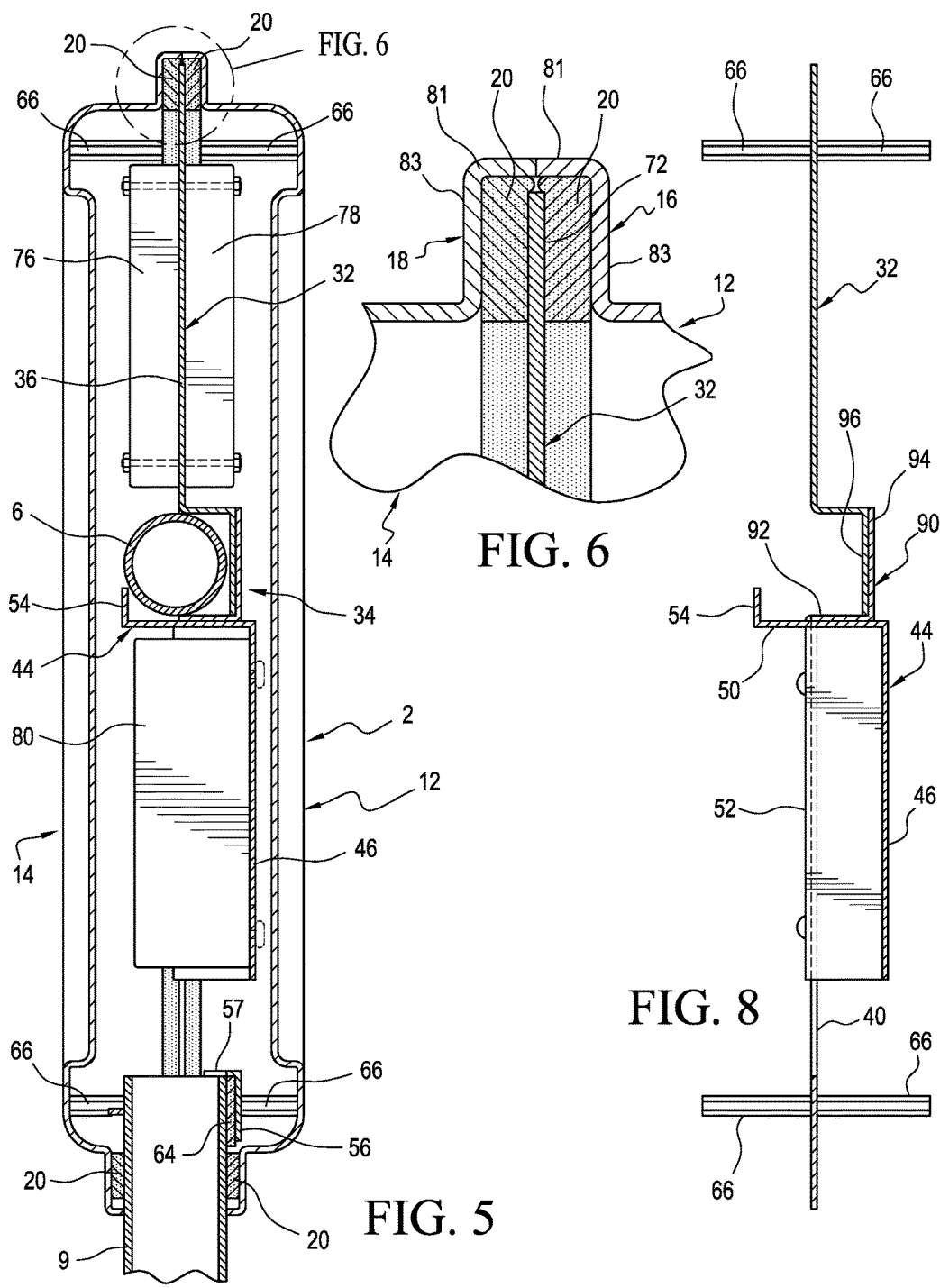

HANDRAIL WI-FI ENCLOSURE

FIELD OF THE INVENTION

The present invention is generally directed to antenna and access point enclosures and in particular to enclosures for antenna and access points for attachment to a handrail or the like in an environment where the utilization of rails (pipe, poles, etc.) as the mounting solution to secure the antenna and access point is necessary.

BACKGROUND OF THE INVENTION

In locations such as stadiums and arenas and the like, a paramount importance has been placed on providing wireless connectivity to attendees attending the events being conducted in the facilities. The architectural designs of these venues limit the options to mount antennas to provide wireless connectivity to the consumers attending an event.

SUMMARY OF THE INVENTION

The present invention provides an enclosure for an access point for attachment to a handrail, comprising a first half-shell including a first peripheral flange portion and a second half-shell including a second peripheral flange portion, the first half-shell and the second half-shell being attached together along the first peripheral flange portion and the second peripheral flange portion to form the enclosure; a mounting plate disposed within the enclosure, the mounting plate including a peripheral edge portion coextensive with the first and second peripheral flange portions, the peripheral edge portion including first and second sides opposed to the respective first and second peripheral flange portions; and a seal disposed along the first and second sides of the peripheral edge portion, the seal on the first side being sandwiched between the first peripheral flange portion and the first side, the seal on the second side being sandwiched between the second peripheral flange portion and the second side.

The present invention further provides an enclosure for an access point for attachment to a handrail, comprising a first half-shell and a second half-shell, the first half-shell and the second half-shell being attached together to form the enclosure; a mounting plate disposed within the enclosure, the mounting plate including a U-shaped section across the mounting plate, the mounting plate including an upper section above the U-shaped section and a lower section disposed below the U-shaped section; the upper section is planar with opposite first and second sides for attachment of first and second antennas, respectively; the lower section including an opening; a box including a base wall, a top wall and left and right side walls, the box is disposed in the opening; and an access point is attached to the base wall.

The present invention provides an enclosure for an access point for attachment to a handrail, comprising, comprising horizontal rail member; a mounting plate including a U-shaped section across the mounting plate, the horizontal rail member is attached in the U-shaped section, the mounting plate including a first side and an opposite second side; the mounting plate including an upper planer section disposed centrally of the horizontal rail member; a first half-shell and a second half-shell identical to the first half-shell, the first half-shell and the second half-shell being attached together to form an enclosure; and a first antenna attached to the first side, and a second antenna attached to the second side.

The present invention further provides an enclosure for an access point for attachment to a handrail, comprising a first half-shell including a first peripheral flange portion and a second half-shell including a second peripheral flange portion, the first half-shell and the second half-shell being attached together along the first peripheral flange portion and the second peripheral flange portion to form the enclosure; a mounting plate disposed within the enclosure, the mounting plate including a peripheral edge portion coextensive with the first and second peripheral flange portions; a seal disposed between peripheral edge portion and the first and second peripheral flange portions; and the first half-shell and the second half-shell are attached to the mounting plate independently of each other.

BRIEF DESCRIPTION OF THE DRAWINGS

FIG. 5 is a cross-sectional view taken along line 5-5 in FIG. 1.

FIG. 6 is an enlarged detail shown in FIG. 5.

FIG. 8 is a cross-sectional view taken along line 8-8 in FIG. 3.

DETAILED DESCRIPTION OF THE INVENTION

Figure 1:
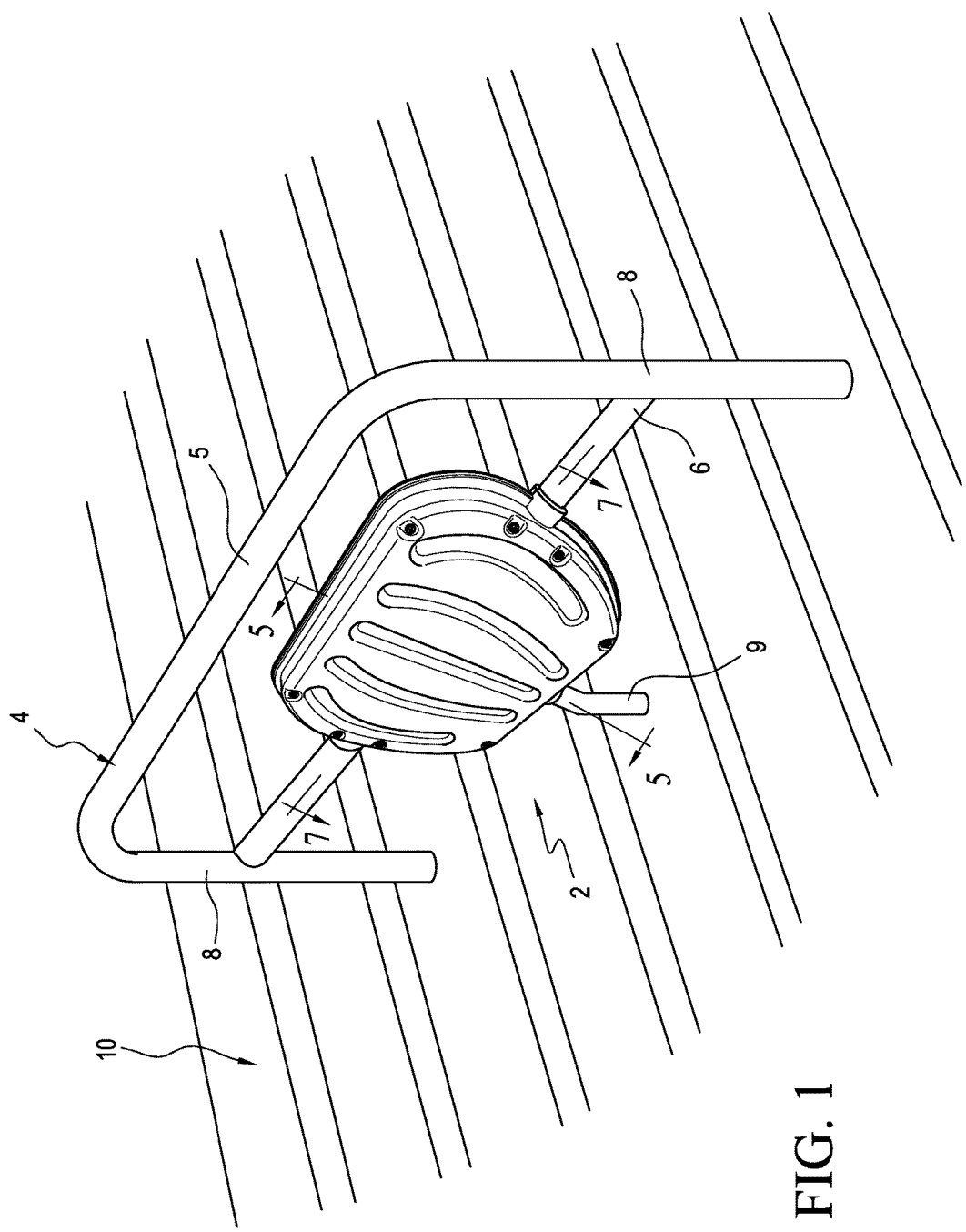
FIG. 1 is a perspective view of an enclosure embodying the present invention for wireless communication equipment.

Referring to FIG. 1, an enclosure 2 for a radio, such as a Wi-Fi access point (for example, Cisco 3802e Access Points) and antenna, embodying the present invention, is shown attached to a handrail 4 having horizontal rail members 5 and 6 and vertical rail members 8. An access point is a networking hardware device that allows a Wi-Fi device to connect to a wired network. A conduit 9, such as a metal pipe, is connected to a bottom portion of the enclosure 2 to provide a protective raceway for the cables that connect the access points inside the enclosure 2 to the building network system. The conduit 9 is bent so it enters perpendicular to the handrail if the rails are not horizontal. The bottom end of the conduit 9 is operably attached to the steps or building structure by standard means, such as a pipe flange.

The enclosure 2 is designed to fit on the handrail of stadiums, arenas and other large public venues. The enclosure 2 addresses large public venues' need to provide an "always connected" Wi-Fi experience.

The handrail 4 is shown attached to a set of stairs 10, such as typically found in a sports stadium. The enclosure 2 is advantageously used to locate the access point to provide Wi-Fi service for the fans' portable devices, such as cellphones, tablets, etc. Several enclosures 2 would be distributed throughout the stadium to provide the appropriate radio coverage.

Figure 2:
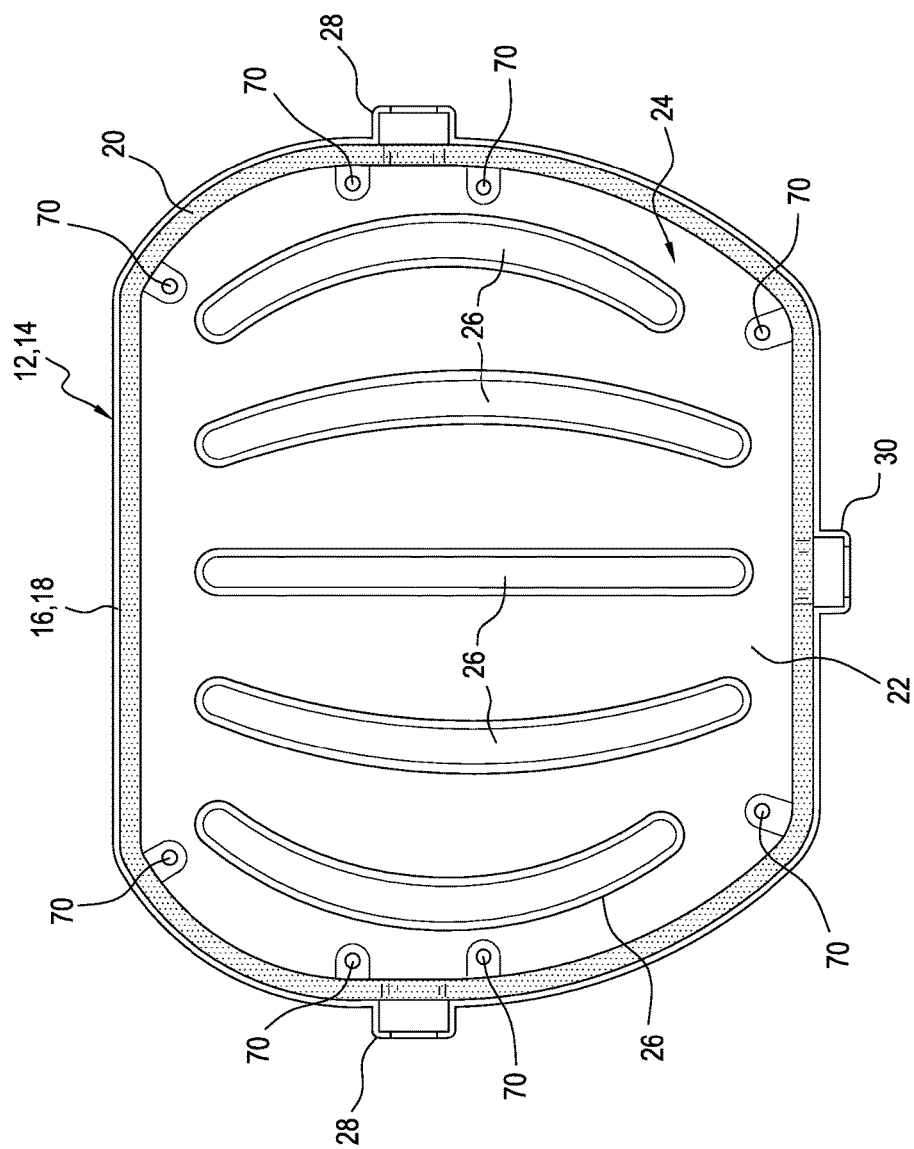
FIG. 2 is an inside elevational view of a half-shell of the enclosure of FIG. 1.

Referring to FIG. 2, the enclosure 2 is made of half-shells 12 and 14 made of plastic material, such as UV resistant, very high impact, wide temperature, outdoor grade polycarbonate, or other suitable materials designed for outdoor installation. The half-shells 12 and 14 are preferably identical to one another, advantageously allowing the use of a one mold and facilitating installation without requiring left or right orientation for the installer. The half-shells 12 and 14 include respective peripheral flanges 16 and 18 provided with respective seals 20.

The half-shells 12 and 14 each provides an interior cavity 22 with a length, width and depth sufficient to fully enclose the access point and antenna to be disposed within the enclosure 2. The half-shells 12 and 14 each includes a wall 24 with a plurality of hollow ribs 26 to advantageously provide rigidity to the wall 24. Half-tubular portions 28 are provided to wrap around the horizontal rail member 6 when the half-shells 12 and 14 are joined together. Half-tubular portion 30 is provided at a bottom portion of each of the half-shells 12 and 14 to wrap around the conduit 9.

Figure 3:
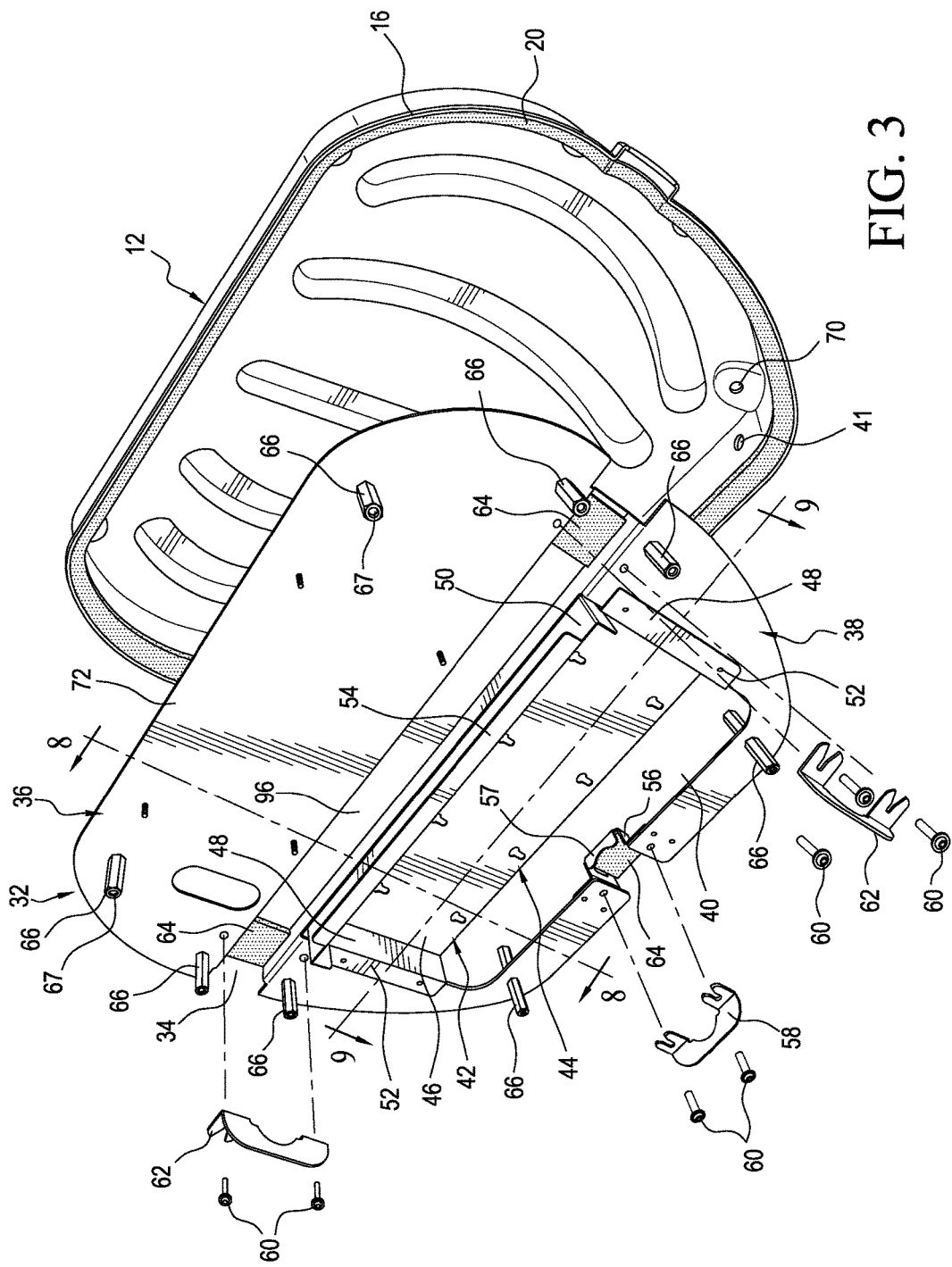
FIG. 3 is a perspective assembly view of a mounting plate and a half-shell of the enclosure.

Referring to FIG. 3, a mounting plate 32 is provided disposed between the half-shells 12 and 14. The plate 32 is preferably made of sheet metal or other suitable material formed with a U-shaped section 34 that divides the mounting plate 32 into an upper section 36 and a lower section 38. The U-shaped section 34 is sized to receive the horizontal rail member 6 to which the mounting plate 32 is attached and the half-shells 12 and 14 are in turn attached to the mounting plate 32. The upper section 36 is preferably planar and is used to mount the antennas on either side of the mounting plate 32. The lower section 38 includes a cut-out 40 so that a mounting surface 42 for the access points can be offset with respect to the plane of the upper section 36 that will advantageously position the access points centrally within the depth of the cavity 22 of the enclosure 2. This advantageously minimizes unnecessary intrusion of the enclosure 2 beyond the diameter of the handrail.

A drain hole 41 at a lower corner of each half-shell 12 and 14 is provided to allow water vapor to escape, to prevent water buildup regardless of installation angle, and equalize atmospheric pressure from internal to ambient to maintain the integrity of the seals 20 and 86.

The mounting surface 42 may be made from sheet metal formed into a box structure 44 with a planar base wall 46, left and right side walls 48 and top wall 50. The side walls 48 have flanges 52 attached to the mounting plate 32. The top wall 50 also has a flange 54 to provide a partial enclosure and thus facilitate the attachment of the mounting plate 32 to the horizontal rail member 6 of the rail 4.

The box structure is preferably a separate unit from the mounting plate 32. In this manner, separate fabrication of the mounting plate 32 and the box structure 44 advantageously reduces manufacturing and tolerance problems. Further, the box structure 44 can be changed out to accommodate different access points.

The lower section 38 has a U-shaped bracket 56 for receiving one end of a conduit for bringing the wires coming from the access points to the building network. The bracket 56 has a flange portion 57 that provides a stop to the end of conduit when placed inside the bracket 56. A removable clamp 58 attaches to the mounting plate 32 with screws 60. The clamp 58 secures the conduit to the mounting plate 32. The clamp 58 is preferably U-shaped.

Clamps 62 are used to attach the horizontal rail member 6 to the mounting plate 32 inside the U-shaped section 34. Screws 60 secure the clamps 62 to the mounting plate 32. Resilient pads 64 advantageously provide pressure against the rail member 6 when the clamps 58 and 60 are tightened.

The clamps 62 are preferably U-shaped. The resilient pads 64 may be made of PVC sealing foam, foam rubber or other suitable materials.

Threaded spacers 66 with threaded openings 67 are attached to each side of the mounting plate 32 adjacent the peripheral edge portion 72. Although shown as hexagonal, the threaded spacers 66 can be round in cross-section or any other cross-sectional shape. The threaded spacers 66 are advantageously used to attach the half-shells 12 and 14 to the mounting plate 32 with screws 68 through openings 70 and threaded to the respective threaded spacers 66. The screws 68 advantageously allow the seal 20 to be compressed against the peripheral edge portion 72. The attachment of the half-shells 12 and 14 to the mounting plate 32 advantageously allows the transfer of any stresses, such as people bumping against the enclosure 2, to the mounting plate 32 and thence to the handrail 4. The threaded spacers 66 advantageously transmit loads and abuse from the enclosure 2 through to the mounting plate 32 and consequently to the railing member 6. The threaded spacers 66 are sized to produce controlled, predictable, repeatable, compression of the seals 20 to the mounting plate 32.

Figure 4:
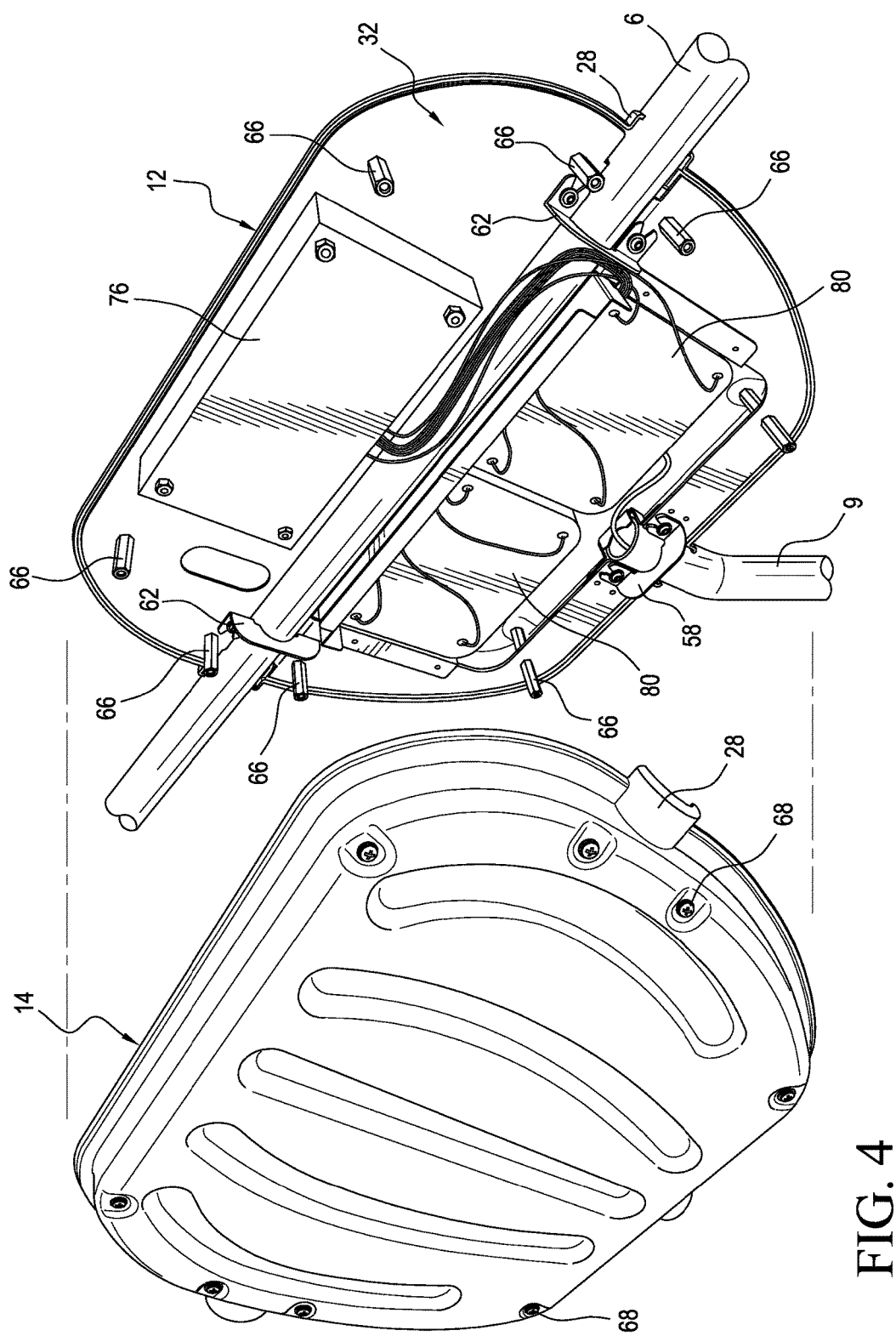
FIG. 4 is a perspective assembly view of the mounting plate attached to a handrail member.

Referring to FIG. 4, the half-shell 12 is shown attached to the mounting plate 32, which has been previously attached to the horizontal member 6. Clamps 62 secure the mounting plate 32 to member 6. Clamp 58 secures the conduit 9 to the mounting plate 32. The conduit 9 when attached to the stairs 10 or floor of the venue advantageously keeps the enclosure 2 from spinning on the rail member 6. Antennas 76 and 78 (shown in FIG. 5) are attached to either side of the mounting plate 32. The access points 80 are shown attached to the base wall 46 attached to the mounting plate 32.

Referring to FIG. 5, the upper section 36 of the mounting plate 32 is advantageously positioned within the enclosure 2 so as to provide sufficient space for attachment of the antennas 76 and 78 to the respective sides of the mounting plate 32. In this manner, even though the mounting plate 32 may be made of metal, the antennas 76 and 78 advantageously provide a wide, unblocked, RF radiation pattern. The mounting plate 32 is preferably aligned about centrally of the cross-section of the rail member 6, advantageously providing for a narrow enclosure and less protrusion beyond the handrail diameter for ADA purposes. The U-shaped section 34 preferably has a depth of about half the diameter of the rail member 6 such that the enclosure when attached to the rail member 6 will be disposed centrally of the rail member 6.

The access points 80 are advantageously accessible from one side of the mounting plate 32 so that only the half-shell 14 may be removed for maintenance of the access points without the need to also remove the other half-shell 12. The attachment of either of the half-shells 12 and 14 to the respective sides of the mounting plate 32 is independent of each other so that the compression of the respective seals 20 by the respective half-shells 12 and 14 occurs independently. For example, referring to FIG. 6, when the half-shell 14 is detached from the mounting plate 32 to gain access to the access points 80 and the antenna 76, the seal 20 compressed by the half-shell 12 is not disturbed and remains compressed.

Referring to FIG. 6, the peripheral edge portion 72 of the mounting plate 32 and the peripheral flange portions 16 and 18 of the half-shells 12 and 14 are advantageously coextensive to provide an effective seal of each half-shell with the respective side of the mounting plate 32. Each half-shell is sealed to respective side of the mounting plate 32 independent of the seal of the other half-shell, allowing for the removal of one half-shell without disturbing the seal of the other half-shell.

The peripheral flanges 16 and 18 are preferably L-shaped with wall portions 81 and 83 to advantageously enclose the seals 20 when pressed against the confronting surfaces of the peripheral edge portion 72. The peripheral edge portion 72 has side surfaces substantially parallel to the wall portions 83 to advantageously provide large contact areas for the seals 20 for an effective seal.

Although the seals 20 are shown as separate units, the seals 20 may also be combined as one U-shaped unit draped over the peripheral edge portion 72.

Figure 7:
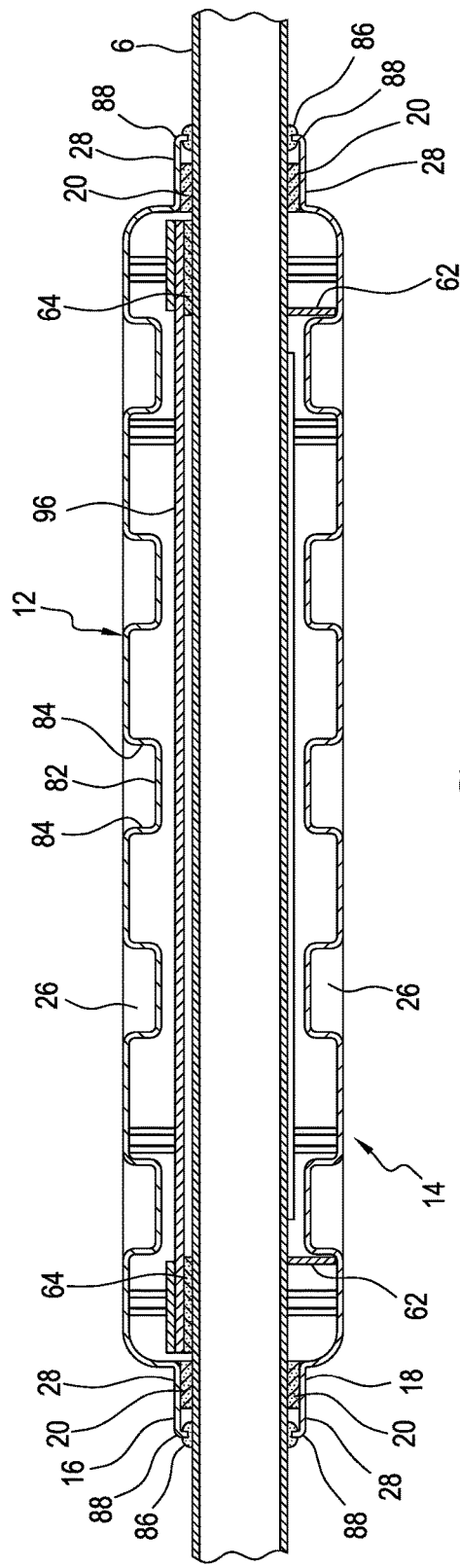
FIG. 7 is a cross-sectional view taken along line 7-7 in FIG. 1.

Referring to FIG. 7, the hollow ribs 26 each includes a base wall 82 and side walls 84. The hollow ribs 26 run generally vertically to advantageously provide rigidity against a load substantially transverse to the face of the enclosure 2, such as when people bump or get pushed against it. The ribs 26 further provide stiffening for the respective peripheral flanges 16 and 18 so that the respective seals 20 will seal evenly around the peripheral edge portion 72 of the mounting plate 32. A seal 86 seals around the peripheral edge portions 88 of the half-tubular portions 28 when the enclosure 2 is attached to the horizontal member 6. The external surfaces of the half-shells 12 and 14 are substantially rounded (also shown in FIGS. 1 and 2) to advantageously prevent clothing snags and unsafe edges that could harm the public.

Referring to FIG. 8, the box structure 44 is attached to the mounting plate 32 with L-shaped brackets 90, with a horizontal leg portion 92 attached to the top wall 50 and a vertical leg portion 94 attached to a bottom wall 96 of the U-shaped section 34.

Figure 9:
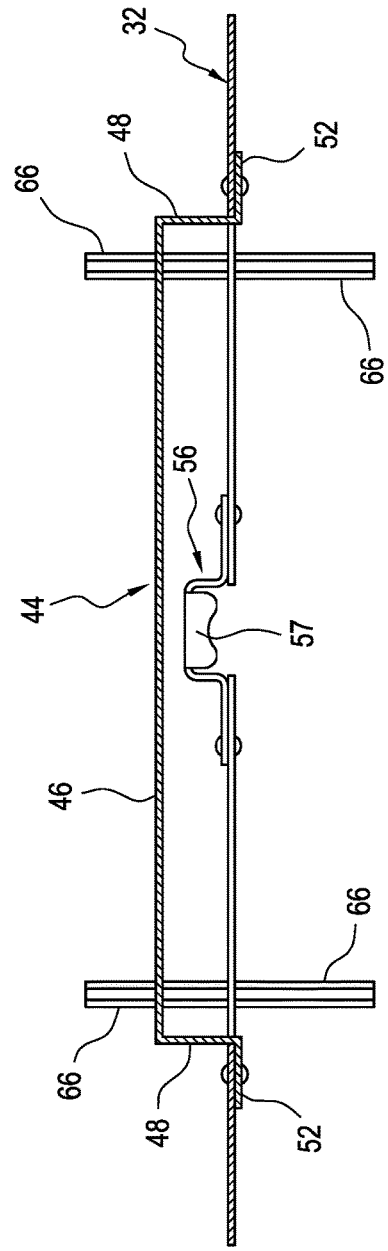
FIG. 9 is a cross-sectional view taken along line 9-9 in FIG. 3.

Referring to FIG. 9, the box structure 44 is shown attached to the mounting plate 32 via the flanges 52.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An enclosure for an access point for attachment to a handrail, comprising:
    a) a first half-shell including a first peripheral flange portion and a second half-shell including a second peripheral flange portion, the first half-shell and the second half-shell being attached together along the respective first peripheral flange portion and the second peripheral flange portion, the first half-shell and the second half-shell together forming the enclosure with a cavity configured to enclose an access point to be disposed within the enclosure;
    b) a mounting plate disposed between the first half-shell and the second half-shell, the mounting plate including a peripheral edge portion coextensive with the first and second peripheral flange portions, the peripheral edge portion including first and second sides opposed to the respective first and second peripheral flange portions; and
    c) a seal disposed along the first and second sides of the peripheral edge portion, the seal on the first side being sandwiched between the first peripheral flange portion and the first side, the seal on the second side being sandwiched between the second peripheral flange portion and the second side.

2. The enclosure as in claim 1, wherein the first peripheral flange portion and the second peripheral flange portion are L-shaped.

3. The enclosure as in claim 1, wherein the first half-shell and the second half-shell include hollow ribs.

4. The enclosure as in claim 1, wherein the mounting plate includes a U-shaped section across an intermediate section of the mounting plate for receiving a horizontal rail member.

5. The enclosure as in claim 1, wherein the mounting plate includes a planar upper section.

6. The enclosure as in claim 1, wherein the first half-shell and the second half-shell are identical.

7. The enclosure as in claim 1, wherein the first half-shell and the second half-shell are separately and detachably attached to the mounting plate.

8. The enclosure as in claim 7, wherein:
    a) threaded spacers are attached to each side of the mounting plate; and
    b) the first half-shell and the second half-shell are detachably attached with screws to the respective threaded spacers.

9. The enclosure as in claim 1, wherein:
    a) the mounting plate includes an intermediate section and a lower section below the intermediate section;
    b) the lower section includes an opening; and
    c) a mounting wall offset from a plane of the upper section is disposed in the opening.

10. The enclosure as in claim 9, wherein the mounting wall includes first and second side walls attached to the lower section.

11. An enclosure for an access point for attachment to a handrail, comprising:
    a) a first half-shell and a second half-shell, the first half-shell and the second half-shell being attached together to form the enclosure;
    b) a mounting plate disposed between the first half-shell and the second half-shell, the mounting plate including an upper section and a lower section;
    c) the lower section including an opening;
    d) a mounting wall offset from a plane of the mounting plate is disposed in the opening; and
    e) an access point is attached to the mounting wall.

12. The enclosure as in claim 11, wherein the upper section includes opposite first and second sides.

13. The enclosure as in claim 12, wherein an antenna is attached to the first side of the mounting plate.

14. The enclosure as in claim 13, wherein another antenna is attached to the second side of the mounting plate.

15. The enclosure as in claim 11, wherein:
    a) an intermediate section across the mounting plate includes a U-shaped section;
    b) the upper section is above the U-shaped section; and
    c) the lower section is below the U-shaped section.

16. The enclosure as in claim 15, wherein the upper section is planar.

17. The enclosure as in claim 11, the mounting wall is part of a box including a base wall, a top wall and left and right side walls.

18. The enclosure as in claim 11, wherein:
    a) the first half-shell includes a first peripheral flange portion and the second half-shell includes a second peripheral flange portion; and b) the first half-shell and the second half-shell are attached together along the respective first peripheral flange portion and the second peripheral flange portion.

19. The enclosure as in claim 11, wherein:
a) the mounting plate includes a peripheral edge portion coextensive with the first and second peripheral flange portions; and
b) the peripheral edge portion including first and second sides opposed to the respective first and second peripheral flange portions.

20. The enclosure as in claim 19, wherein a seal is disposed along the first and second sides of the peripheral edge portion.

21. An enclosure for an access point for attachment to a handrail, comprising:
a) a mounting plate for attachment to a rail member of a handrail, the mounting plate including a first side and an opposite second side;
b) a first half-shell attached to first side of the mounting plate and a second half-shell attached to the opposite second side of the mounting plate, the first half-shell being identical to the second half-shell, the first half-shell and the second half-shell together forming the enclosure with a cavity within the enclosure; and
c) a first antenna attached to the first side, and a second antenna attached to the second side.

22. The enclosure as in claim 21, wherein an intermediate section of the mounting plate is U-shaped for receiving the rail member.

23. The enclosure as in claim 22, wherein the mounting plate includes a planar section disposed above the intermediate section and a lower section below the intermediate section.

24. The enclosure as in claim 23, wherein the first antenna and the second antenna are attached to the planar section.

25. The enclosure as in claim 23, wherein an access point is attached to the lower section.

26. The enclosure as in claim 21, wherein:
a) the mounting plate includes a lower section with an opening;
b) a box including a base wall, a top wall and left and right side walls, the box is disposed in the opening; and
c) an access point is attached to the base wall.

27. An enclosure for an access point for attachment to a handrail, comprising:
a) a first half-shell including a first peripheral flange portion and a second half-shell including a second peripheral flange portion, the first half-shell and the second half-shell being attached together along the respective first peripheral flange portion and the second peripheral flange portion, the first half-shell and the second half-shell together forming the enclosure with a cavity within the enclosure for an access point;
b) a mounting plate disposed between the first half-shell and the second half-shell, the mounting plate including a peripheral edge portion coextensive with the first and second peripheral flange portions; and
c) the first half-shell and the second half-shell are attached to the mounting plate independently of each other.

28. The enclosure as in claim 27, wherein:
a) the mounting plate includes a first side and an opposite second side; and
b) the first half-shell is attached to the first side; and
c) the second half-shell is attached to the second side.

29. The enclosure as in claim 28, wherein:
a) threaded spacers are attached to the first and second sides side of the mounting plate; and
b) the first half-shell and the second half-shell are detachably attached with screws to the respective threaded spacers.

30. The enclosure as in claim 27, wherein a seal is operably associated with the peripheral edge portion and the first and second peripheral flange portions.

* * * * *